US012300227B2

(12) United States Patent
Liscombe et al.

(10) Patent No.: US 12,300,227 B2
(45) Date of Patent: May 13, 2025

(54) CUSTOMIZING COMPUTER GENERATED DIALOG FOR DIFFERENT PATHOLOGIES

(71) Applicant: Modality.AI, San Francisco, CA (US)

(72) Inventors: Jackson Liscombe, New Marlborough, MA (US); Hardik Kothare, Burlingame, CA (US); Doug Habberstad, Savannah, GA (US); Andrew Cornish, Gore (NZ); Oliver Roesler, Weyhe (DE); Michael Neumann, Waiblingen (DE); David Pautler, San Francisco, CA (US); David Suendermann-Oeft, San Francisco, CA (US); Vikram Ramanarayanan, San Francisco, CA (US)

(73) Assignee: Modality.AI, San Francisco, CA (US)

( * ) Notice: Subject to any disclaimer, the term of this patent is extended or adjusted under 35 U.S.C. 154(b) by 164 days.

(21) Appl. No.: 17/724,320

(22) Filed: Apr. 19, 2022

(65) Prior Publication Data
US 2022/0335939 A1  Oct. 20, 2022

Related U.S. Application Data

(60) Provisional application No. 63/176,626, filed on Apr. 19, 2021.

(51) Int. Cl.
G10L 15/22 (2006.01)
G10L 25/66 (2013.01)
(Continued)

(52) U.S. Cl.
CPC .............. *G10L 15/22* (2013.01); *G10L 25/66* (2013.01); *G10L 25/84* (2013.01); *G10L 25/93* (2013.01)

(58) Field of Classification Search
CPC ......... G10L 15/22; G10L 25/66; G10L 25/84; G10L 25/93; G10L 25/78; G10L 2025/783; G10L 2025/786
See application file for complete search history.

(56) References Cited

U.S. PATENT DOCUMENTS 5,357,427 A    10/1994  Langen et al.
9,311,932 B2 *  4/2016  Carter ................... G10L 15/04
(Continued)

FOREIGN PATENT DOCUMENTS

WO    2016154139    9/2016

OTHER PUBLICATIONS

Cedarbaum, et al. "The ALSFRS-R: a revised ALS functional rating scale that incorporates assessments of respiratory function," J.M. Cedarbaum et al. / Journal of the Neurological Sciences 169 (1999) 13-21. 5 pages.

(Continued)

Primary Examiner — Douglas Godbold
(74) Attorney, Agent, or Firm — Sikander M. Khan

(57) ABSTRACT

A computer-generated dialog session is customized for a user having a pathology characterized at least in part by a speech pathology. The user's speech is analyzed for spans of speech in which the starts and ends of the spans satisfy predetermined thresholds of time. Customization occurs by altering at least one of the following configurable parameters: (a) a threshold minimum signal strength of speech (dB) to consider as the start of the span of speech; (b) an adjustment factor by which signal strengths of background noise increases between consecutive spans of speech; (c) a threshold between signal strength during the span of speech and signal strength during the span of non-speech; (d) a start speech time threshold; and (e) an end speech time threshold.

10 Claims, 8 Drawing Sheets

(51) Int. Cl.
  *G10L 25/84* (2013.01)
  *G10L 25/93* (2013.01)

(56) References Cited

U.S. PATENT DOCUMENTS

| | | | |
|---|---|---|---|
| 10,592,733 | B1 | 3/2020 | Ramanarayanan et al. |
| 2007/0033042 | A1* | 2/2007 | Marcheret ............... G10L 25/78 704/215 |
| 2012/0144336 | A1 | 6/2012 | Pinter et al. |
| 2013/0211832 | A1* | 8/2013 | Talwar .................... G10L 15/20 704/E15.039 |
| 2014/0278386 | A1* | 9/2014 | Konchitsky .......... H04R 1/1083 704/226 |
| 2015/0051906 | A1* | 2/2015 | Dickins ................... G10L 25/78 704/210 |
| 2015/0058013 | A1* | 2/2015 | Pakhomov .............. G10L 25/87 704/243 |
| 2015/0126888 | A1 | 5/2015 | Patel et al. |
| 2015/0356982 | A1* | 12/2015 | Chesney ................. G10L 25/78 704/275 |
| 2018/0090127 | A1* | 3/2018 | Hofer ...................... G10L 15/07 |
| 2018/0214061 | A1 | 8/2018 | Knoth et al. |
| 2018/0310866 | A1 | 11/2018 | Wrenn |
| 2019/0074028 | A1 | 3/2019 | Howard |
| 2019/0198043 | A1* | 6/2019 | Crespi ..................... G10L 15/22 |
| 2019/0325898 | A1* | 10/2019 | O'Hart Kinney ....... G10L 15/02 |
| 2019/0348065 | A1* | 11/2019 | Talwar .................... G10L 25/78 |
| 2019/0378537 | A1* | 12/2019 | Li .......................... G10L 15/063 |
| 2019/0385711 | A1 | 12/2019 | Shriberg et al. |
| 2020/0296513 | A1* | 9/2020 | Littrell ................... G01R 19/02 |
| 2020/0349938 | A1 | 11/2020 | Hwang et al. |
| 2020/0365275 | A1 | 11/2020 | Barnett et al. |
| 2021/0098110 | A1 | 4/2021 | Periyasamy et al. |
| 2021/0118329 | A1* | 4/2021 | Medan .................... A61B 5/486 |
| 2021/0121124 | A1* | 4/2021 | Shenhar .................. G10L 25/66 |
| 2021/0158834 | A1* | 5/2021 | Medan ................... G10L 13/033 |
| 2022/0148570 | A1* | 5/2022 | Weissberg .............. G10L 13/08 |
| 2023/0018524 | A1* | 1/2023 | Ramanarayanan .... A61B 7/003 |
| 2023/0386504 | A1* | 11/2023 | Lee ......................... G10L 25/30 |

OTHER PUBLICATIONS

Bombaci, et al. "Telemedicine for management of patients with amyotrophic lateral sclerosis through COVID-19 tail," Neurological Sciences (2021) 42:9-13. 5 pages.
Victoria Young MHSc & Alex Mihailidis PhD (2010) Difficulties in Automatic Speech Recognition of Dysarthric Speakers and Implications for Speech-Based Applications Used by the Elderly: A Literature Review, Assistive Technology, 22:2, 99-112, DOI: 10.1080/10400435.2010.483646. 15 pages.
Stegmann, et al. "Earyl detection and tracking of bulbar changes in ALS via frequent and remote speech analysis," npj Digital Medicine (2020) 3:132. 5 pages.
Suendermann-Oeft, et al. "NEMSI: A Multimodal Dialog System for Screening of Neurological or Mental Conditions," ACM International Conference on Intelligent Virtual Agents (IVA '19), Jul. 2-5, 2019. 3 pages.
Green, et al. "Algorithmic Estimation of Pauses in Extended Speech Samples of Dysarthric and Typical Speech," J Med Speech Lang Pathol. Dec. 2004 ; 12(4): 149-154. 9 pages.
Byers, et al. "2017 Pilot Open Speech Analytic Technologies Evaluation," NISTIR. 27 pages.
Kodrasi, et al. "Spectro-Temporal Sparsity Characterization for Dysarthric Speech Detection," IEEE/ACM Transactions on Audio, Speech, and Language Processing, vol. 28, 2020. 13 pages.
Janbakhshi, et al. "Subspace-Based Learning for Automatic Dysarthric Speech Detection," IEEE Signal Processing Letters, vol. 28, 2021. 5 pages.
Lee, et al. "Vowel-Specific Intelligibility and Acoustic Patterns in Individuals With Dysarthria Secondary to Amyotrophic Lateral Sclerosis," Journal of Speech, Language, and 34 Hearing Research • vol. 62 • 34-59 • Jan. 2019. 27 pages.
Goetz, et al. "MDS-UPDRS: The MDS-sponsored Revision of the Unified Parkinson's Disease Rating Scale," International Parkinson and Movement Disorder Society. 2018. 33 pages.
Boersma, et al. "Praat: doing phonetics by computer," file:///S:/M/Modality.AI/103678.0005US%20Multimodal%20Dialog%20Based%20Remote%20Patient%20Monitoring/References,%20cited/Praat_%20doing%20Phonetics%20by%20Computer.html. 2 pages.
Kothare, et al. "Speech, Facial and Fine Motor Features for Conversation-Based Remote Assessment and Monitoring of Parkinson's Disease," 4 pages.
Arora, et al. "Detecting and monitoring the symptoms of Parkinson's disease using smartphones: a pilot study," 18 pages.
Roesler, et al. "Multimodal Dialog Based Remote Patient Monitoring of Motor Function in Parkinson's Disease and Other Movement Disorders," Modalitiy.AI and U of CA, San Francisco, 6 pages.
Getz, Lindsey. "MMSE vs. MoCA: What You Should Know," Today's Geriatric Medicine, 2 pages.
Jia, et al. "A comparison of the Mini-Mental State Examination (MMSE) with the Montreal Cognitive Assessment (MoCA) for mild cognitive impairment screening in Chinese middle-aged and older population: a crosssectional study," BMC Psychiatry, 2021, 13 pages.
Naumann, et al. "Investigating the Utility of Multimodal Conversational Technology and Audiovisual Analytic Measures for the Assessment and Monitoring of Amyotrophic Lateral Sclerosis at Scale," Interspeech, 2021. 5 pages.
Vasquez-Correa, et al. "Towards an automatic evaluation of the dysarthria level of patients with Parkinson's disease," Journal of Communicaiton Orders. 76 (2018) 21-36, 16 pages.
Mundt, et al. "Voice acoustic measures of depression severity and treatment response collected via interactive voice response (IVR) technology," J Neurolinguistics. Jan. 2007 ; 20(1): 50-64, 17 pages.
Yunusova, Y., Green, J.R., Wang, J., Pattee, G., Zinman, L. A Protocol for Comprehensive Assessment of Bulbar Dysfunction in Amyotrophic Lateral Sclerosis (ALS). J. Vis. Exp. (48), e2422, doi:10.3791/2422 (2011, 5 pages.
Lisetti, et al. "Now All Together: Overview of Virtual Health Assistants Emulating Face-to-Face Health Interview Experience." 11 pages.
Morales, et al. "Modelling Errors in Automatic Speech Recognition for Dysarthric Speakers," EURASIP Journal on Advances in Signal Processing vol. 2009, Article ID 308340, 14 pages.
Neumann et al., "On the Utility of Audiovisual Dialog Technologies and Signal Analytics for Real-time Remote Monitoring of Depression Biomarkers," Modality.ai, Inc., 6 pages.
Ivascu et al., "A multi-agent Architecture for Ontology-based Diagnosis of Mental Disorders," 17 International Symposium on Symbolic and Numeric Algorithms for Scientific Computing, 8 pages.

\* cited by examiner (a) Microphone loudness while participant is silent.

(b) Microphone loudness while participant is speaking.

(a) Optimized per cohort.

(a) Optimized per cohort.

(a) DetectionCost Function.

(b) Interruption Rate.

CUSTOMIZING COMPUTER GENERATED DIALOG FOR DIFFERENT PATHOLOGIES

This application claims priority to U.S. provisional application Ser. No. 63/176,626 filed Apr. 19, 2021. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is telemedicine.

BACKGROUND

The following description includes information that may be useful in understanding the present invention. It is not an admission that any of the information provided herein is prior art or relevant to the presently claimed invention, or that any publication specifically or implicitly referenced is prior art.

Conversational dialog technology is increasingly being recognized as a useful means of automating remote patient monitoring and diagnostics for dysarthric speakers at scale. However, the characteristics of dysarthric speech introduce multiple challenges for various speech processing components of such systems.

Mobile health and telemedicine can provide substantial benefit for the diagnosis, detection, and monitoring of neurological and mental health conditions [13]. Indeed, the COVID-19 pandemic has underscored the importance of telemedicine and remote patient monitoring in providing care for patients with chronic neurological disorders [1]. A spoken or multimodal dialog system is one such mobile health technology that offers the potential to improve availability, frequency, and quality of care. This technology can be used to conduct automated screening interviews that previously required face-to-face sessions with a clinician [6, 15, 20].

Pending U.S. patent application Ser. No. 17/471,929, "Use Of Virtual Agent To Assess Psychological And Medical Conditions" describes apparatus, systems, and methods in which a virtual agent converses with a responding person to assess one or more psychological or other medical conditions of the responding person. The virtual agent uses both semantic and affect content from the responding person to branch the conversation, and also to interact with a data store to provide an assessment of the medical or psychological condition.

The '929 application taught deriving semantic and/or affect content from evaluating a patient's response during a conversational question session. Responses evaluated included facial expressions, eye movements, extent of eye contact, posture, hand gestures, and audible speech. Evaluated speech characteristics included voice pitch, voice speed, voice loudness, and a non-verbal utterance.

Research and development has continued, and the inventors herein have focused on automating remote patient monitoring and diagnostics systems for dysarthric speakers at scale. However, the characteristics of dysarthric speech introduce multiple challenges for various speech processing components of such systems.

As most dialog systems have been developed for non-disordered adult speech, the performance of such systems can decrease substantially when confronted with dysarthric speech, a symptom of many neurological diseases such as Parkinson's, Alzheimer's, multiple sclerosis, or Amyotrophic Lateral Sclerosis (ALS) [21]. One component that is particularly crucial for seamless dialog interaction is voice activity detection (VAD); however, the special characteristics of dysarthric speech, like poor articulation, disfluencies, extended intra-word pause lengths, atypical acoustic properties, etc., make VAD a much more challenging problem than when applied to healthy speech [10, 12]. While there has been much work on automatic speech recognition for dysarthric speakers [4, 2, 11, 18, 9], it appears that there has been no comprehensive analysis of voice activity detection in the specific context of multimodal dialog applications for ALS patients (pALS), and more generally for patients with dysarthria.

pALS exhibit a characteristic hoarseness in their voice due to a variety of possible reasons. These include irregular contraction of intrinsic and extrinsic laryngeal muscles, poor laryngeal adduction due to tremor of the arytenoids, sialorrhea and retention of saliva, uncoupling of the larynx and supralaryngeal vocal tract, and fluctuation in subglottal pressure due to impaired control of laryngeal and respiratory muscles [17]. Spectral acoustic features of dysarthric speech in ALS are atypical in that impaired fundamental frequency range and vowel-specific intelligibility patterns due to high F1 formant frequency values and reduced F2 formant frequency values are observed [14]. Additionally, changes in temporal features of speech such as longer and more variable pause durations are also observed in pALS [8]. While such distinct characteristics of dysarthric speech render corresponding voice biomarkers extremely valuable in tracking the onset and progression of ALS [7, 16, 19], these atypical duration, speed, and spectral characteristics relative to healthy controls pose challenges to VAD for smooth user experience.

Accordingly, there is a need for a cloud-based dialog agent for monitoring dysarthric patients, and for tuning VAD parameters for an optimal user experience across different cohorts and speaking task types.

As used herein, the term "patient" means any person with which a human or virtual practitioner is communicating with respect to a psychological or other condition, or potential such conditions, even if the person has not been diagnosed, and is not under the care of any practitioner. A patient is also from time to time herein referred to as a "responding person".

As used herein, the term "practitioner" broadly refers to any person whose vocation involves diagnosing, treating, or otherwise assisting in assessing or remediating psychological and/or other medical issues. In this usage, practitioners are not limited to medical doctors or nurses, or other degreed providers. Still further, as used herein, "medical conditions" should be interpreted as including psychological conditions, regardless of whether such conditions have any underlying physical etiology.

As used herein, the terms "assessment", "assessing", and related terms means weighing information from which at least a tentative conclusion can be drawn. The at least tentative conclusion need not rise to the level of a formal diagnosis.

As used herein, the term "virtual agent" broadly refers to a computer or other non-human functionality configured to operate as a practitioner in assessing or remediating psychological and/or other medical issues. Virtual agents having functionalities augmented by one or more humans are still considered herein to be virtual agents.

In the following discussion, references to computing devices and computer-related functions should be interpreted broadly as including one or more computing devices operating independently or cooperatively, and having at least one processor configured to execute software instructions stored on a computer readable tangible, non-transitory medium.

SUMMARY OF THE INVENTION

The inventive subject matter provides apparatus, systems and methods in which a computer-generated dialog session is customized for a user having dysarthric speech, or other speech pathology.

In especially preferred embodiments, the customization includes the steps of identifying (a) a span of speech and (b) a span of non-speech in an audio stream of the user's speech; identifying a start of speech in the audio stream as a function of the span of speech continuing for a first threshold period of time; identifying an end of speech in the audio stream as a function of the span of non-speech continuing for a second threshold period of time; and seeking to improve a performance of the method by altering at least one of the following configurable parameters: (a) a threshold minimum signal strength of speech (dB) to consider as the start of the span of speech; (b) an adjustment factor by which signal strengths of background noise increases between consecutive spans of speech; (c) a threshold between signal strength during the span of speech and signal strength during the span of non-speech; (d) a start speech time threshold; and (e) an end speech time threshold.

An exemplary dialog session can advantageously begin with a microphone check for speech and background noise, followed by a conversation-based call flow in which a user responds to prompts to execute at least one of the following tasks: (a) an open-ended question about difficulty in speaking, salivating, swallowing (OQ); (b) sustained vowel phonation; (c) Oral Diadochokinesis Alternating Motion Rate (DDK AMR) or repetition of the syllables /pAtAkA/(DDK); (d) Speech Intelligibility Test Sentences (SIT); (e) read speech of a designated passage; and (f) spontaneous speech while describing a picture.

Configuration of the configurable parameters can be advantageously carried out by identifying a user as having a particular speech pathology, and using the identification to set at least one of the configurable parameters. Such identification, and identification of progression of the particular speech pathology in the user can involve one or more questionnaires. Configuration of the configurable parameters can additionally or alternatively be carried out as a function of at least one of the user's linguistics, prosody, voice quality, articulation, and acoustics.

The step of identifying the spans of speech and non-speech is preferably a binary decision, although it can include iterative re-estimation of speech sounds and background noise. Such identification can also include determining spans of speech to be those in which an average signal level of speech sounds (dB) exceeds an average signal level of the background noise (dB) by a threshold amount.

Verification and further research can involve calculating a weighted penalty of proportions of false positive and false negative times, when compared to a hand annotation of actual speech in the audio stream. Verification and further research can involve ascertaining scores for at least three different domains affected by the pathology, bulbar, limb, or respiratory.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
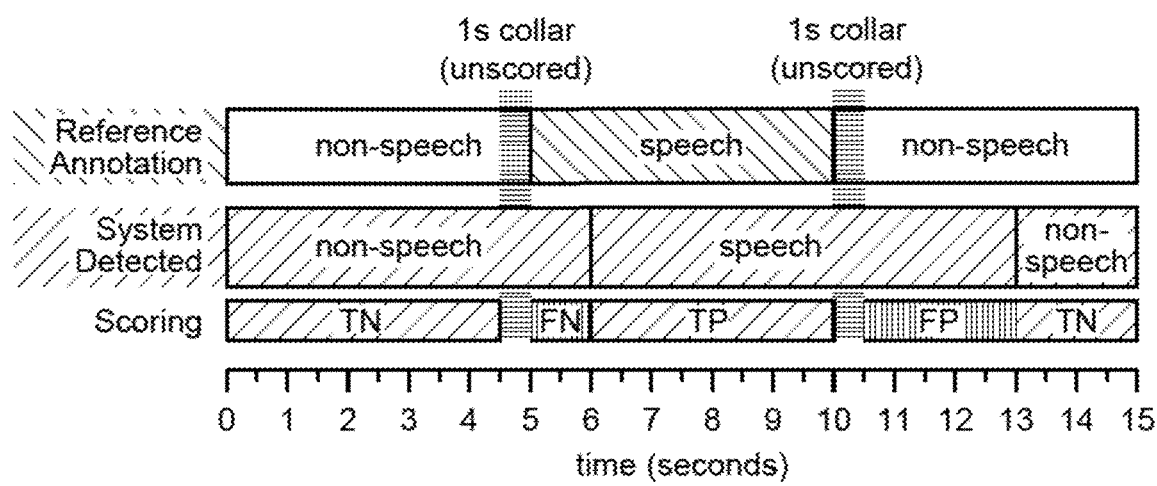
FIG. 1 is a graph depicting segmentation of hypothetical speech and VAD output of the same audio stream. The third tier shows the four possible outcomes used for scoring.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Voice Activity Detection in NEMSI

We use NEMSI (Neurological and Mental health Screening Instrument)—a cloud based multimodal dialog system that conducts on-demand automated screening interviews for the assessment or monitoring of various neurological and mental health conditions—for the VAD experiments described in this paper [20]. Dialog turn management in NEMSI is managed in part by voice activity detection (VAD) using the CMU Sphinx open source speech recognition toolkit. See https://cmusphinx.github.io/. The algorithm uses a twostep process to identify spans of speech and non-speech in a stream of audio.

As each frame of audio is processed, a speech classifier makes a binary decision on whether or not it represents speech. The energy of a particular frame is calculated as the logarithm of the root mean square of the energy of the given samples within that frame. If this value is less than a minimum threshold, it is marked as non-speech. The algorithm employs iterative, and preferably continuous, re-estimation of background energy (i.e., noise) in the following manner. Starting from a high initial value, the background energy of each frame is reset to the energy value of the current frame if it is less than the current value. If not, the background energy estimation is raised by a small amount proportional to the difference between the current average and background energy values. The algorithm also employs a continuous re-estimation of average signal level. If the average signal level is greater than the background noise level by a certain amount, the current audio is marked as speech; otherwise, it is marked as non-speech.

Once the speech classifier has made its decision, the frame classifications are sent to a second algorithm. The speech marker notes the span length of contiguous speech or non-speech frames. Once it sees a number of contiguous speech frames of a certain length, it considers a speech turn to have started. Once in a speech turn, the speech marker looks for a long enough contiguous sequence of non-speech frames to decide that the participant has finished their turn.

In sum, there are five VAD parameters whose values can be configured to optimize performance. These are: (i) minSignal, the minimum required energy level (dB) for a speech frame; (ii) adjustment, the factor by which the background level estimation is increased with each successful speech frame; (iii) threshold, the energy level of the required difference between the background noise and average signal level estimations (dB); (iv) startSpeech, time in milliseconds required to trigger the start of a speech event, and (v) endSilence, time in milliseconds required to designate the end of a speech turn.

Data

The dataset discussed herein came from 135 participants in an ongoing project involving patients with Amyotrophic Lateral Sclerosis (ALS) and healthy controls in collaboration with EverythingALS and the Peter Cohen Foundation. (see https://www.everythingals.org/research). 17 of the 135 users participated in two sessions each, bringing the total number of sessions to 152.3 Demographic data was available for 131/135 users. Of these, 91 were female and 40 were male. The age range was 18-76 years and the mean age was 49.85 17.43 years. 50 users were diagnosed with ALS, 8 users were diagnosed with Primary Lateral Sclerosis (PLS) or another motor neuron disease, 73 users did not have ALS, and diagnosis information for 4 users was unavailable at the time of writing. All sessions were completed between 2020-09-24 and 2021-02-22.

Each session began with a microphone check for speech and noise. The users then took part in a conversation-based call flow where they produced speech in response to prompts during the following tasks: (a) an open-ended question about difficulty in speaking, salivating, swallowing (OQ); (b) sustained vowel phonation of /A/(A); (c) Oral Diadochokinesis Alternating Motion Rate (DDK AMR) or repetition of the syllables /pAtAkA/(DDK); (d) Speech Intelligibility Test sentences (SIT); (e) read speech of passage about bamboo [22] (R); and (f) spontaneous speech while describing a picture (S). Table 1 shows the prompts associated with each speaking task, in the order they are presented in the dialog.

TABLE 1

Exemplar prompt excerpts from our ALS study protocol that we use to elicit speech (and corresponding facial movements) from participants for different task types during the course of an interactive dialog.

| Task | Prompt Text |
|------|-------------|
| OQ | Have you had any challenges when speaking, salivating, or swallowing? If so, please briefly describe any difficulties. |
| A | Please take a deep breath and then say "aaa" until you run out of breath |
| DDK | Please take a deep breath and say "pataka" over and over until you run out of breath |
| SIT | Now I'm going to read several sentences to you and I want you to repeat them. Please say, "The job provides many benefits." [Repeated 5 more times with different sentences.] |
| R | Please read the text aloud to me, to the best of your ability. Try to read at your normal pitch and loudness. Begin whenever you are ready. [Participant shown text of passage about bamboo.] |
| S | Please describe what you see happening in this picture. Please try to speak for at least one minute. Go ahead. |

At the end of active speech production tasks, users filled out a questionnaire for the Amyotrophic Lateral Sclerosis Functional Rating Scale Revised (ALSFRS-R), a validated rating instrument to monitor the progression of ALS [5]. The questionnaire consists of 12 questions in total with a maximum possible ALSFRS-R score of 48. Based on answers to groupings of questions, three sub-scores can be calculated for different domains affected by the disease: bulbar, limb, or respiratory. For this investigation, we were particularly interested in bulbar involvement, which indicates speech impairment. Bulbar sub-score ranges from 0 to 12. We stratified the 152 sessions into three separate cohorts based on the following: (a) control: healthy controls with ALSFRS-R score=48; (b) bulbar: diagnosed with ALS/PLS and bulbar sub-score <12; (c) other: diagnosed with ALS/PLS and ALSFRS-R score <48 and bulbar sub-score=12. In all, 47 sessions were classified into the bulbar, 82 into the control, and 23 into the other cohort. See FIG. 1.

Methods

NIST Detection Cost Function

We employed the standard NIST Detection Cost Function (DCF) [3] to measure how well the CMU Sphinx VAD predictions were, given a set of values for the configurable parameters described in para [0036]. The DCF score is a weighted penalty of the proportion of false positive and false negative time, when compared to a hand annotation of actual speech in an audio stream. Since ignoring true speech is usually most detrimental to a spoken dialog system, DCF traditionally penalizes false negatives more than false positives. Refer to FIG. 1 for a visual aid in our discussion of the four possible outcomes of a VAD prediction when compared to a reference hand annotation. True negative time (TN) is the time when the VAD algorithm predicted no speech and the user was not speaking. True positive time (TP) is the time when the VAD algorithm predicted speech and the user was speaking. False negative time (FN) is the time when the VAD algorithm predicted no speech but the user was speaking. False positive time (FP) is the time when the VAD algorithm predicted speech but the user was not speaking. Additionally, the calculation of DCF takes into account a "collar" of time both preceding and following the user speech which is not factored into the false negative or false positive times. This is an acknowledgement of the fact that perfect VAD prediction is unlikely. We used a collar length of 1.0 second. We then compute the DCF as follows:

$PFP$=total $FP$ time annotated total non-speech time/ annotated total non-speech time $PFN$=total $FN$ time annotated total speech time/annotated total non-speech time $$DCF = 0.75 \times PFN + 0.25 \times PFP$$

VAD Annotation Procedure

Figure 2:
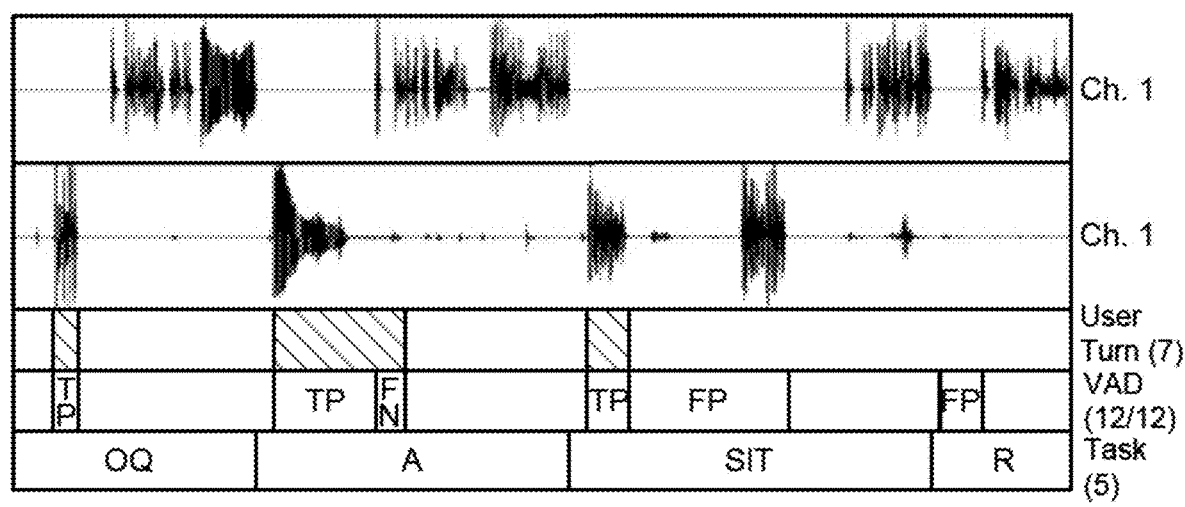
FIG. 2 is an example VAD annotation of participant speech in an excerpt of a NEMSI dialog. Ch 1 is the audio channel for NEMSI prompts. Ch 2 is the audio channel for user speech. OQ, A, SIT, and R represent task type.

We annotated our corpus in a way that allowed us to compute the DCF score for each turn in a NEMSI dialog both in production and in offline simulation experiments. FIG. 2 shows an excerpt of a dialog with annotation. The topmost audio channel (Ch 1) is NEMSI's audio stream and Ch 2 is the participant's. The first annotation tier (User Turn) marks the speech (in blue) that comprises the participant task response. The last annotation tier (Task) shows the task type for this turn, marked from the end of the previous NEMSI prompt up to the beginning of the next prompt. The annotation tier in between those two (VAD) shows the region in the participant speech channel that was detected as a participant turn. In this example, the user speech in the OQ task was correctly detected by VAD. All of the user speech turn is considered true positive (TP) time.

The remaining three tasks show VAD errors. In the A task the user was interrupted by NEMSI. Since we are collecting data from a deployed dialog system, we are unsure how long the participant would have continued to speak had they not been interrupted, but the portion of time in which both NEMSI and the user are speaking simultaneously is annotated as false negative (FN) time. In the SIT task, the reader will notice that only the first part of the participant response has been annotated as the user speech turn. This is a situation that can arise from VAD settings that are too sensitive to background noise. In this case, it was clear from listening to the dialog that the participant repeated their turn after a significant pause because the VAD did not end in a reasonable amount of time, indicating to the participant that they were not heard. This repeated speech is annotated as false positive (FP) time and it is important to do so because an optimal VAD configuration setting must produce the end of the turn before the repeated speech to be correct. Note that while the repeated speech would most likely also be treated as its own VAD event, we use only the end of the first detected VAD event to signal the end of a participant turn in the dialog system. In the last task (R) the participant did not say anything at all; the VAD incorrectly accepted background noise as participant speech.

In addition to the above annotation paradigm, we also hand-annotated the turn-internal speech and silence events within each participant turn. A speech event comprises each sub-turn speech event without any internal silences. A silence event was considered to be any region of non-speech longer that 35 ms that occurred between the first and last speech events of a participant's turn.

Simulation Experiments

We ran offline simulated VAD experiments on annotated participant sessions with the aim of discovering the optimal configuration settings for the most accurate spoken turn detection. We chose a parameter space that amounted to 45,000 different VAD configurations (the bounds of this space were chosen empirically based on values that yielded successful past VAD performance). For each offline simulation run, we chose a specific value set for the five configurable CMU Sphinx VAD parameters described in para [0036]. We then split the session into user turns using the interval points in the Turn annotation tier. We sent each turn through the VAD algorithm in order to obtain the VAD start and end time, if any. If more than one VAD event was detected, we only considered the first one since this event would end the turn in a deployed dialog system. We then computed DCF scores for each of these simulated runs and observed VAD configuration parameter values that optimized DCF.

Analyses and Observations

Analysis of Annotated Internal Silence and Speech Events

Figure 3A:
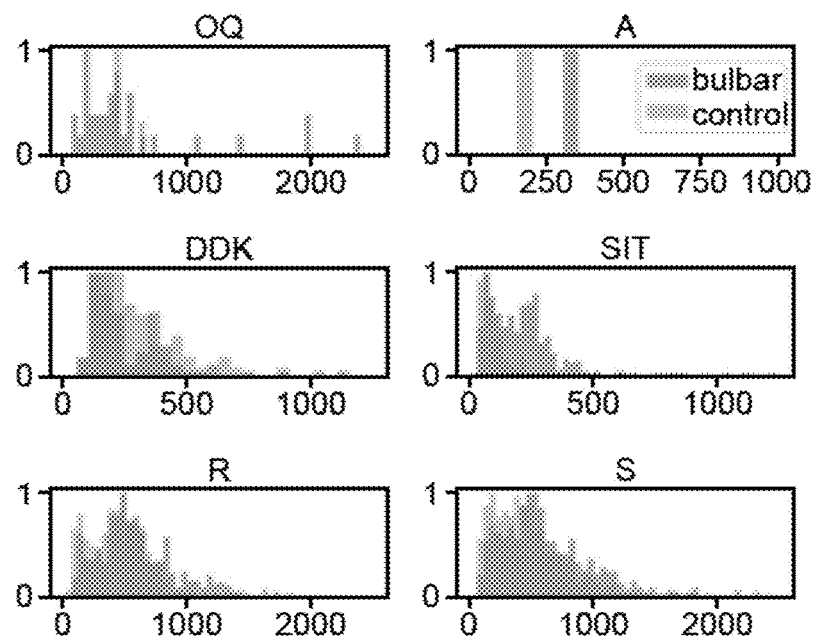
FIGS. 3A and 3B are normalized histograms of hand-annotated internal silence/speech events per cohort per task. Each bin is 50 ms in duration.

Over the entire corpus, we observed that the bulbar cohort participants produced more silences of 400 ms or longer than the control cohort, in line with our expectations. FIG. 3A shows normalized histograms of silence durations for the control and bulbar cohorts across different speaking task types. The SIT, R, and S tasks show the same overall trend of the bulbar cohort producing silences of longer durations; the SIT task shows the most extreme case of this. For the A task, there were not many silences to speak of for either cohort. This is expected since participants were asked to sustain a single vowel for as long as possible in a single breath. For the OQ task, the bulbar cohort produced more silences over all, both short and long ones.

Figure 3B:
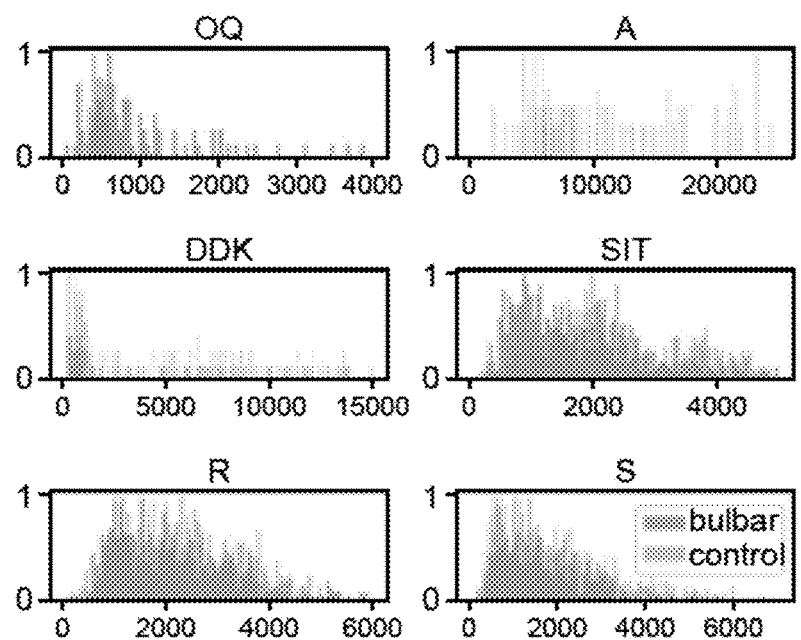

FIG. 3B correspondingly shows histograms for speech events for each speaking task. In both the A and DDK tasks-in which participants are asked to produce each speech event for as long as possible-we see that the control cohort tended to produce longer speech events than the bulbar cohort, though both cohorts showed a wide range of speech event durations. For the OQ task, the bulbar cohort produced more speech events of variable length; the control cohort almost exclusively produced speech events between 250 and 600 ms in length. Since this task is an open-ended question asking whether the participant has had trouble speaking or not (and if so, how), this is most likely due to the fact that most control subjects simply answered, "no." We see the length of speech events in both the R and S tasks to be comparable among cohorts, even though FIG. 3A shows that the bulbar cohort tended to produce longer pauses between speech events. The SIT task stands out in that a larger percentage of speech events were produced at a length of between 500 1500 ms for the bulbar cohort, whereas speech events tended to be of longer duration for control subjects.

Analysis of Speaker Loudness

Figure 4A:
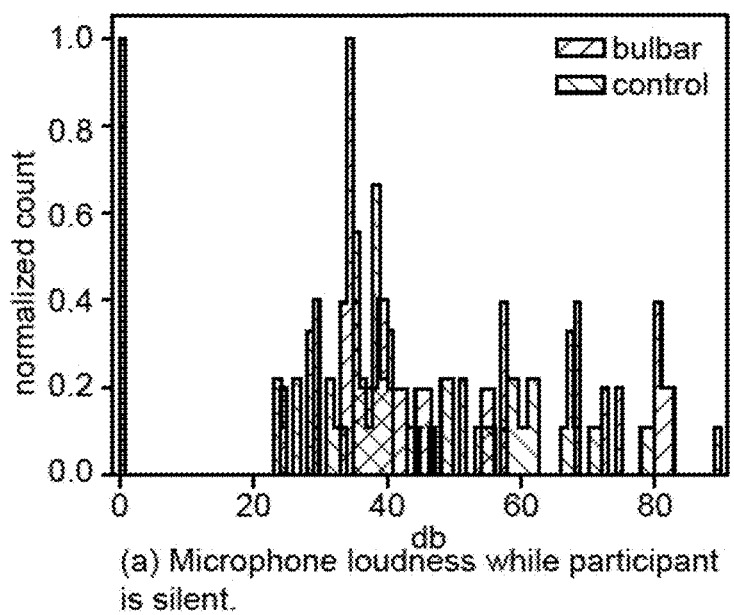
FIGS. 4A and 4B are normalized histograms of loudness during microphone check under two conditions for the bulbar and control cohorts.
Figure 4B:
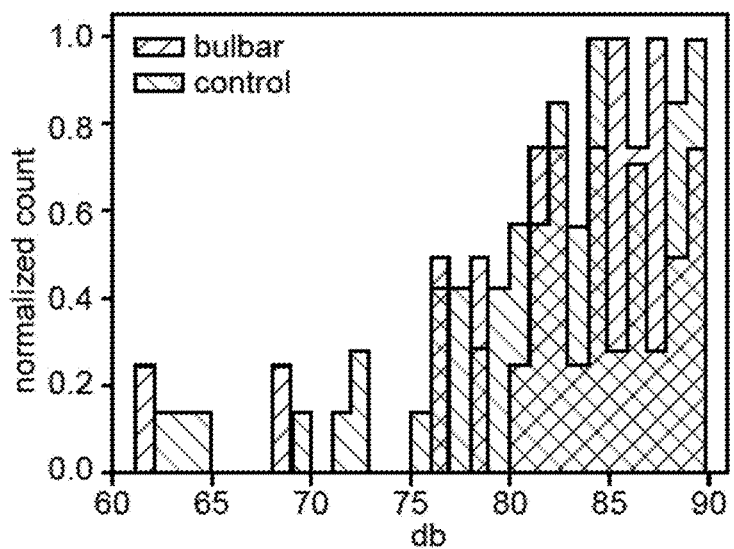

FIGS. 4A and 4B are histograms of loudness recorded during the microphone check while the participant is silent and when they are speaking for 134 sessions for which we have microphone information. Notice the high variability of background noise and speech loudness that could be both due to speaker pathology as well as the variability in speaker devices and environment that is required to facilitate large-scale, cost-efficient user access to such dialog technology. This variability poses challenges for energy-based VAD systems that we will need to consider during parameter tuning in optimizing for performance.

DCF Optimization

In this section we present results of exhaustive offline VAD simulations, examining the results when optimizing by both cohort and task type. This experimental design was motivated by an initial pilot study applying this approach in our deployed NEMSI system. Our initial VAD settings were chosen by altering default values via ad hoc quality assurance testing in-house. We collected 91 sessions (1,047 turns) produced with these settings and annotated the VAD performance according to paragraphs [0042] to [0044]. We observed the DCF to be 0.048 and interruption rate (IR) to be 0.074. Interruption rate is measured as the number of turns in which the NEMSI system prematurely detected the end of user speech, divided by the total number of user turns. Though DCF does not explicitly optimize for IR, these turns do contribute to false negative time in the function. We include IR here and below because it is of interest to most dialog system developers. Using these initial 91 sessions, we ran a few hundred offline simulations with different VAD configuration parameter values and released a new version of NEMSI into production with the values that produced the lowest DCF. We then collected and annotated 104 sessions (1,188 turns) and computed DCF and IR on this new data. Seeing that this lowered DCF to 0.021 and IR to 0.012, we felt justified in running more ambitious simulation experiments.

Optimization Per Participant Cohort

Figure 5:
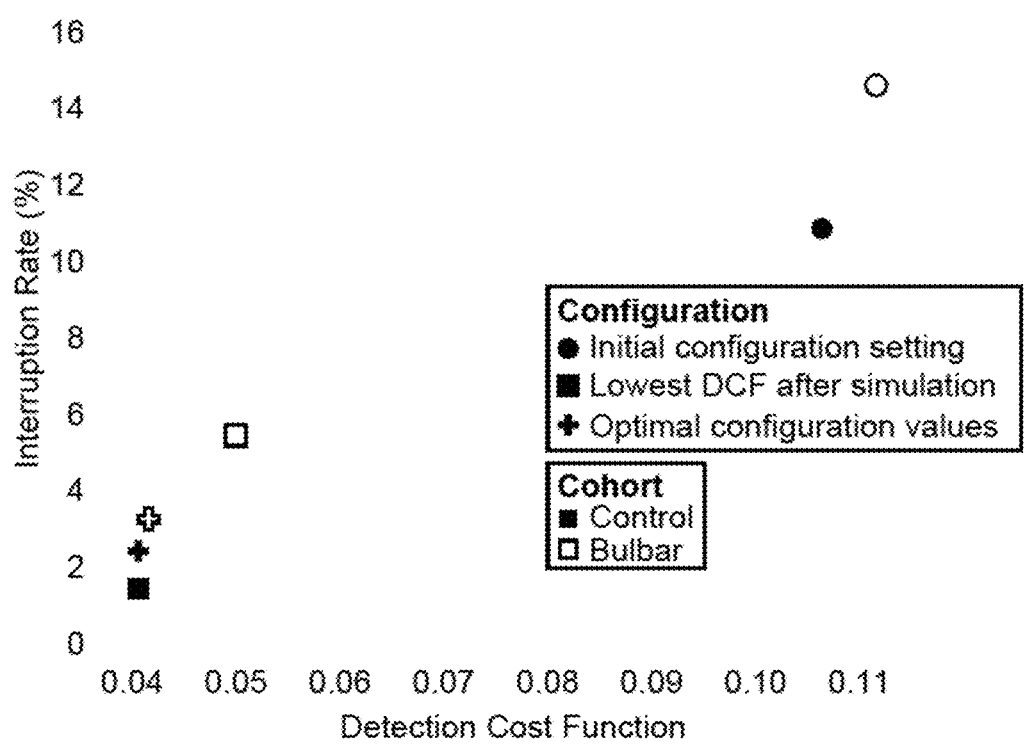
FIG. 5 is a graph showing DCF and IR of the ALSFRS-R control and bulbar cohorts under three different conditions: using VAD configuration settings prior to tuning (circles), using configuration settings after optimizing for lowest DCF over the entire corpus (squares), and using different configuration settings optimized for each cohort (plusses).

This section explores how to find optimal VAD parameter settings for different participant cohorts, particularly bulbar pALS vs healthy controls, in our dataset. This dataset comprises 906 dialog turns of controls and 518 of the bulbar cohort. We found the DCF scores of the cohorts to be 0.106 for control and 0.111 for bulbar using our initial VAD settings. The corresponding interruption rate was 0.107 for the control cohort and 0.143 for bulbar. These metrics are plotted as circles in FIG. 5 and serve as our baseline performance. We next explored how DCF and IR would look per cohort after running 45,000 brute force simulations, optimizing for DCF over all three cohorts combined. As plotted with squares in FIG. 5, the values were reduced to DCF=0.041, IR=0.018 for control and DCF=0.050, IR=0.056 for bulbar. Finally, we wanted to see if each cohort could be optimized separately for even better VAD performance. From the same set of simulations we selected the configuration with the lowest DCF value per cohort. We found that DCF could be further reduced by doing so, as shown by the plusses in FIG. 5. However, IR was only reduced for the bulbar cohort and in fact slightly increased for the control cohort: DCF=0.041, IR=0.027 for control and DCF=0.042, IR=0.035 for bulbar.

The optimal endSilence value found for the bulbar cohort was observed to be 2500 ms, whereas for the control cohort it was found to be shorter at 2200 ms. This corroborates the general finding of the hand-annotated internal silence events (see FIG. 3A) in that the bulbar cohort tended to produce longer internal silences. An optimal VAD configuration for this cohort should be one that waits longer than for control subjects to make sure the participant has finished speaking before terminating the VAD event.

Optimization Per Speaking Task Type

Figure 6A:
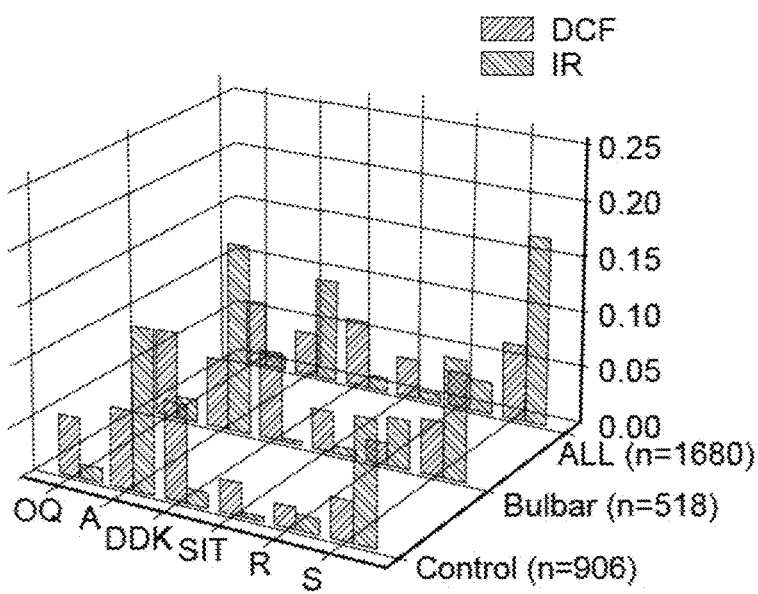
FIGS. 6(a) and 6(b) are graphs showing DCF and IR per task type when using optimal VAD configuration values (a) per cohort or (b) both per cohort and task. Task performance is shown for the bulbar and control cohorts as well as all cohorts combined (including the other cohort.)
Figure 6B:
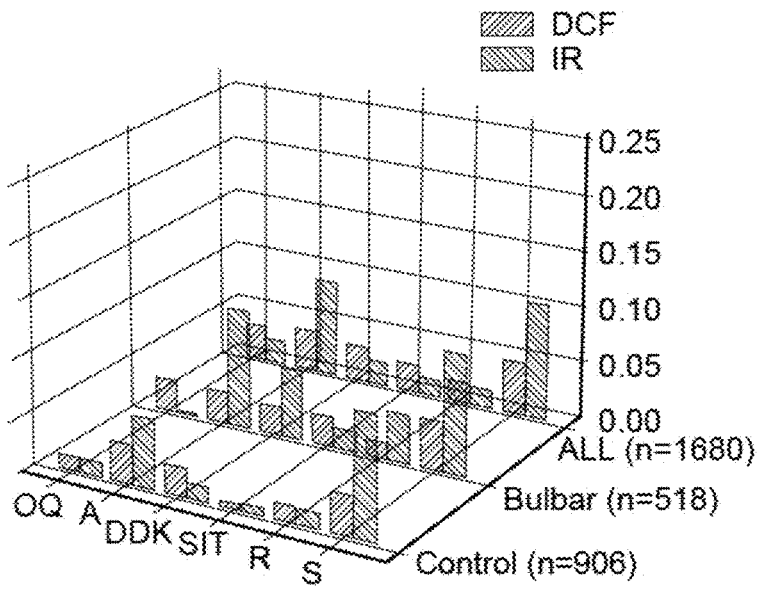

In addition to partitioning the data by cohort, we also observed the effect on performance metrics when partitioning by task type. FIGS. 6a and 6b show DCF and IR by task for all cohorts combined (ALL) as well as by task within the control and bulbar cohorts separately. FIG. 6A lists task performance using the parameter values optimized per cohort. The results shown in FIG. 6B were obtained when applying different optimal VAD configuration settings per task and cohort. When configuring VAD per task and cohort type in this way, we observed a reduction in DCF in all cases and a reduction in IR in almost all cases.

Table 2 shows the optimal endSilence and startSpeech values per task type and cohort.

this difference is up to one second or more. Furthermore, the values differ in magnitude per task for both cohorts. The optimal time to wait before triggering the end of a turn for the S task is between 2200 2500 ms whereas it is between 1000 and 2000 ms for the SIT task. These differences are most likely attributable to the cognitive load of the task. For example, in the picture description task (S), participants presumably pause turn-internally to think about what they are describing; whereas, such pauses are less frequent in the SIT task, where they are asked to read a short sentence they see on screen.

Optimal startSpeech values appear to differ less per cohort type, though do differ per task type. The amount of speech time necessary to trigger the beginning of a VAD event is lowest for both the open-ended question task OQ (50 90 ms) and for the DDK task (70 90 ms). As FIG. 3B shows, each of these tasks have more speech events of very short duration than the other tasks. In the DDK task, each participant is asked to repeat the three-syllable nonsense word /pAtAkA/over and over again until they run out of breath. There is a rapidity to this task that is unlike natural speech and the produced vowels are often very short. For the OQ task, there are many very short "no" responses to the question. The optimal VAD configuration settings thus require a short startSpeech time for these tasks to pick up these speech events; whereas, the VAD in other tasks would consider such a short burst of energy as non-speech noise.

No clear patterns emerged for the energy-based configuration parameters: minSignal, threshold, adjustment.

Cross Validation

Figure 7A:
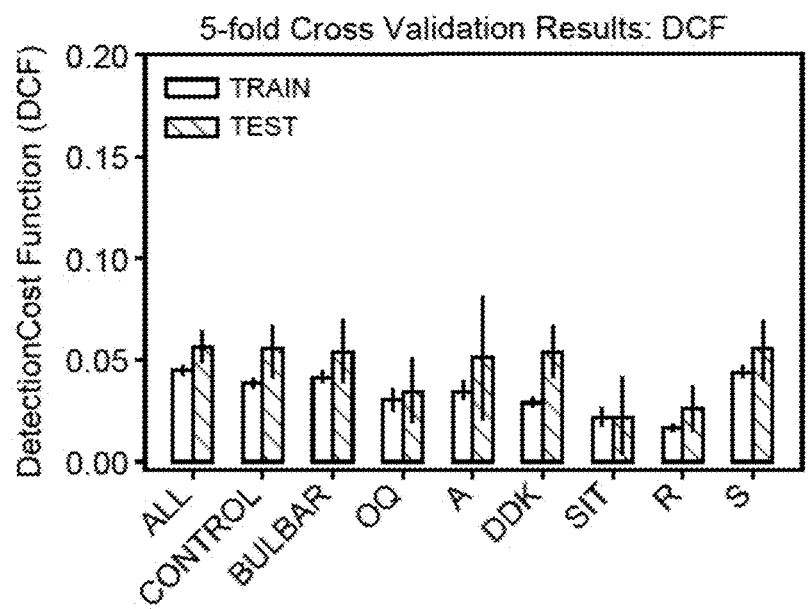
FIGS. 7A and 7B are mean and standard deviation results of 5-fold cross validation.
Figure 7B:
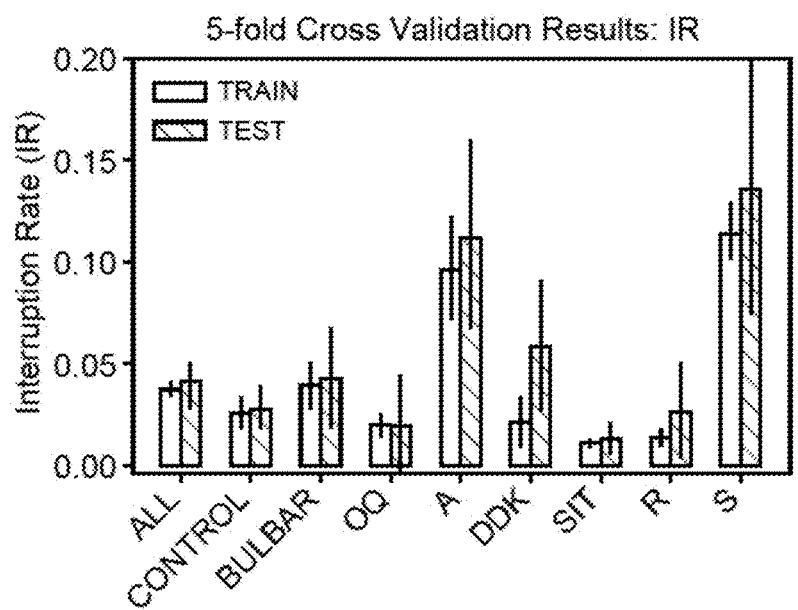

In order to see how well we might expect an optimized VAD configuration value to perform on new and unseen data, we ran several cross-validation simulations. FIGS. 7A and 7B show the results. Sub-corpora were selected according to different criteria: the entire corpus (ALL), all the turns for each cohort (CONTROL and BULBAR), and just the turns for each task with the cohorts combined (e.g., OQ). Then, the sessions were randomly divided into 5 partitions and all of the turns associated with that session were added to the appropriate partition. In this way, no data from a single session was ever in more than one partition. In cases where sessions from multiple cohorts were present in the sub-corpus, we stratified sampling by ensuring that each partition contained the same proportion of sessions from each cohort equal to their distribution in the overall corpus. In each iteration, the optimal configuration was found from the four partitions comprising the training set. This configuration was then applied to the test partition. Each fold comprised the following number of turns per sub-corpus displayed: ALL, 336; CONTROL, 181; BULBAR, 104; and each task type fold contained roughly 30 turns except for SIT which contained 183 turns because there were six such tasks in each session. We ran ANOVA and pairwise t-tests for the metrics of each iteration of the training/test sets and found a significant difference only for DCF on the DDK task (p=0.0389). In other words, performance on unseen test data

|  | OQ | | A | | DDK | | SIT | | R | | S | |
|---|---|---|---|---|---|---|---|---|---|---|---|---|
| Parameter | C | B | C | B | C | B | C | B | C | B | C | B |
| endSilence | 1100 | 2500 | 1800 | 1100 | 1800 | 1900 | 1000 | 2000 | 1800 | 2300 | 2200 | 2500 |
| startSpeech | 50 | 90 | 190 | 190 | 90 | 70 | 150 | 150 | 190 | 150 | 190 | 50 |

For every task except A, we see that the optimal endSilence value was longer for the bulbar cohort. In some cases, closely mirrors performance on the training data for all speaking task types except DDK. This gives us confidence in the generalizability and robustness of our results. See FIGS. 7A and 7B, depicting mean and standard deviation results of 5-fold cross validation.

Figure 8:
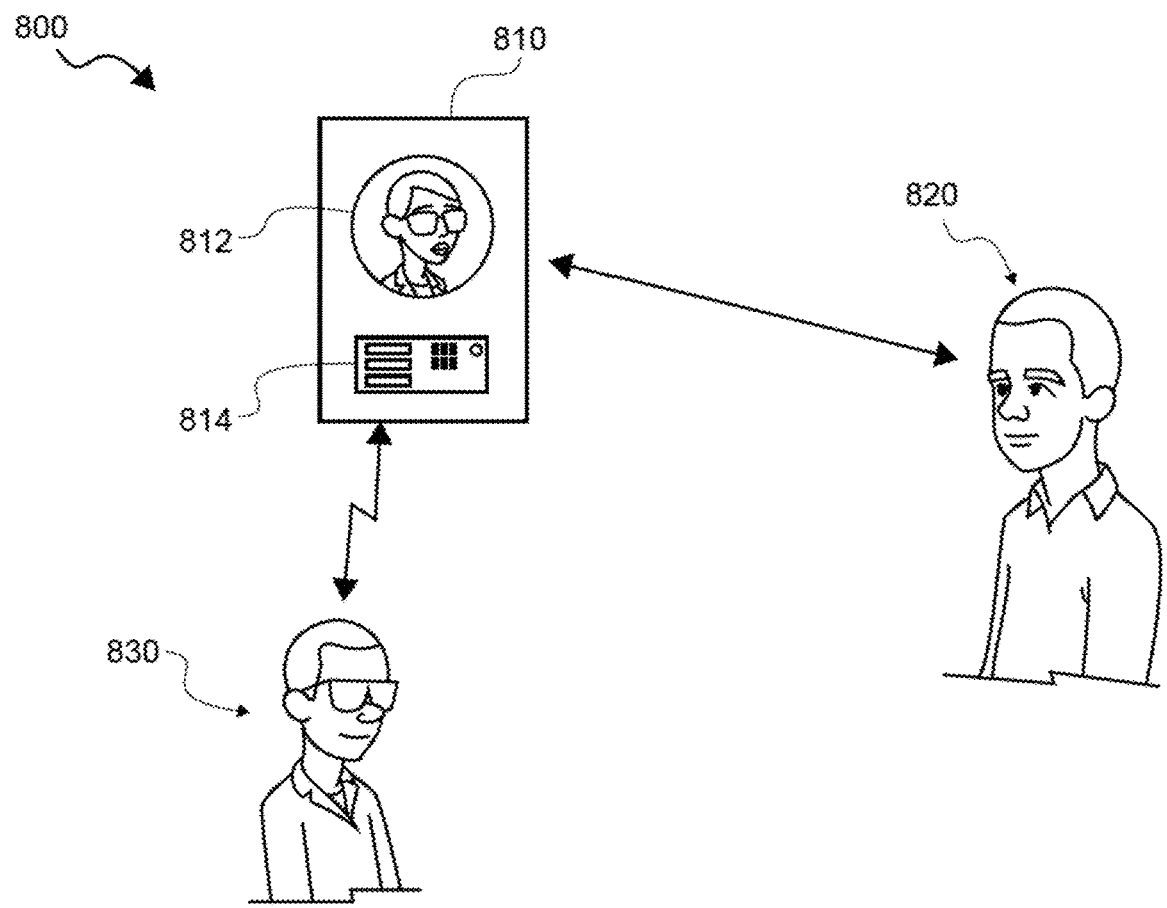
FIG. 8 is a schematic of an avatar speaking with a user using computer-generated dialog.

FIG. 8 is a schematic 800 of an avatar 812 speaking with a user 820 using computer-generated dialog. The avatar 812 is generated and controlled by computer 814, and the avatar 812 and computer 814 are both included in computer system 810. A health care practitioner 830 can interact with the computer system 810, and with the user 820 either directly or through the computer system.

SUMMARY

In the assessment of dysarthria using spoken conversational AI, correct VAD performance is of paramount importance because accurate participant assessment relies on accurately capturing participant speech for each task. We found that optimal VAD configuration differed between dysarthric and control speakers. Most notably, the optimal amount of silence to wait before triggering the end of a turn was longer for the participants in the bulbar cohort. This finding corresponds to the longer and more variable pauses that dysarthric speakers produce, as identified in previously cited studies as well as in our own analysis. We found that paying attention to task type was also important. In most standardized assessments of dysarthric speech, the tasks are designed to elicit speech in a wide variety of contexts, often very unlike speech produced in natural conversation. Most notable examples of this are the Oral Diadochokinesis Alternating Motion Rate (DDK) and the long sustained vowel (A) tasks. For the DDK and A tasks, it was found that a shorter duration for triggering the start of speech was optimal; whereas, in tasks that are designed to introduce high cognitive load, such as the picture description task (S), waiting for a pause of up to two and a half seconds before ending the end of turn was optimal. In the end, we found that optimizing VAD parameters over both speaker and task type yielded the best VAD performance, as measured by the DCF. Furthermore, the results of cross validation give us confidence that the findings are not due to over-fitting, but rather will generalize to unseen data.

There are two main areas we intend to explore in the future. The first is to attempt to modify the DCF equation. In our findings there were a few cases in which the lowest DCF score did not produce the lowest interruption rate (IR). We believe this is an artifact of our data. Since we obtained our data from a deployed dialog system, when an interruption by NEMSI occurs, the participant stops speaking shortly after being interrupted. Though this does result in some false negative time, it is often a very short amount of time and the user might in fact have spoken much longer had they not been interrupted. We expect that we can alter the weighting of false negative and false positive time, or even explicitly add an interruption penalty, that would produce a modified DCF that would also always optimize for interruption rate. The second area of future research will be to explore how these findings generalize when using different VAD algorithms; in particular, those that take into account information beyond just the signal energy—rich information contained in the time-varying frequency spectrum, for instance—for determining whether an audio frame is speech or not. We hypothesize that our findings on pause durations will hold, though we hope to discover differences in voice and spectral quality between cohorts as well.

REFERENCES

[1] A. Bombaci, G. Abbadessa, F. Trojsi, L. Leocani, S. Bonavita, and L. Lavorgna. Telemedicine for management of patients with amyotrophic lateral sclerosis through COVID-19 tail. *Neurological Sciences*, pages 1-5, 2020.

[2] S. A. Borrie, M. J. McAuliffe, J. M. Liss, C. Kirk, G. A. O'Beirne, and T. Anderson. Familiarisation conditions and the mechanisms that underlie improved recognition of dysarthric speech. *Language and Cognitive Processes*, 27(78):1039-1055, 2012.

[3] F. R. Byers. NIST Open Speech Analytic Technologies Evaluation OpenSAT 2019. 2019.

[4] S. O. Caballero Morales and S. J. Cox. Modelling errors in automatic speech recognition for dysarthric speakers. *EURASIP Journal on Advances in Signal Processing*, 2009:1-14, 2009.

[5] J. M. Cedarbaum, N. Stambler, E. Malta, C. Fuller, D. Hilt, B. Thurmond, and A. Nakanishi. The ALSFRS-R: a revised ALS functional rating scale that incorporates assessments of respiratory function. *Journal of the Neurological Sciences*, 169(1-2):13-21, 1999.

[6] D. DeVault, R. Artstein, G. Benn, T. Dey, E. Fast, A. Gainer, K. Georgila, J. Gratch, A. Hartholt, M. Lhommet, G. Lucas, S. Marsella, F. Morbini, A. Nazarian, S. Scherer, G. Stratou, A. Suri, D. Traum, R. Wood, Y. Xu, A. Rizzo, and L.-P. Morency. SimSensei Kiosk: A virtual human interviewer for healthcare decision support. In *Proceedings of the International Conference on Autonomous Agents and Multi-Agent Systems (AAMAS)*, Paris, France, 2014 May.

[7] P. Gomez, D. Palacios, A. Gomez, V. Rodellar, and A. R. Londral. Articulation acoustic kinematics in ALS speech. In 2017 *International Conference and Workshop on Bio-inspired Intelligence (IWOBI)*, pages 1-6. IEEE, 2017.

[8] J. R. Green, D. R. Beukelman, and L. J. Ball. Algorithmic estimation of pauses in extended speech samples of dysarthric and typical speech. *Journal of medical speech-language pathology*, 12(4):149, 2004.

[9] P. Janbakhshi, I. Kodrasi, and H. Bourlard. Subspace-based learning for automatic dysarthric speech detection. *IEEE Signal Processing Letters*, 2020.

[10] R. D. Kent and Y.-J. Kim. Toward an acoustic typology of motor speech disorders. *Clinical linguistics & phonetics*, 17(6):427-445, 2003.

[11] M. J. Kim, J. Yoo, and H. Kim. Dysarthric speech recognition using dysarthriaseverity-dependent and speaker-adaptive models. In *Interspeech*, pages 3622-3626, 2013.

[12] I. Kodrasi and H. Bourlard. Spectro-temporal sparsity characterization for dysarthric speech detection. *IEEE/ACM Transactions on Audio, Speech, and Language Processing*, 28:1210-1222, 2020.

[13] S. Kumar, W. Nilsen, M. Pavel, and M. Srivastava. Mobile health: Revolutionizing healthcare through transdisciplinary research. *Computer*, 46(1):28-35, 2012.

[14] J. Lee, E. Dickey, and Z. Simmons. Vowel-specific intelligibility and acoustic patterns in individuals with dysarthria secondary to amyotrophic lateral sclerosis. *Journal of Speech, Language, and Hearing Research*, 62(1):34-59, 2019.

[15] C. Lisetti, R. Amini, and U. Yasavu. Now all together: Overview of virtual health assistants emulating face-to-face health interview experience. *KIKünstliche Intelligenz*, 29:161-172, March 2015.

[16] R. Norel, M. Pietrowicz, C. Agurto, S. Rishoni, and G. Cecchi. Detection of amyotrophic lateral sclerosis (ALS) via acoustic analysis. *bioRxiv*, page 383414, 2018.

[17] D. Robert, J. Pouget, A. Giovanni, J.-P. Azulay, and J.-M. Triglia. Quantitative voice analysis in the assess-

[18] F. Rudzicz. Acoustic transformations to improve the intelligibility of dysarthric speech. In *Proceedings of the Second Workshop on Speech and Language Processing for Assistive Technologies*, pages 11-21, 2011.

[19] G. M. Stegmann, S. Hahn, J. Liss, J. Shefner, S. Rutkove, K. Shelton, C. J. Duncan, and V. Berisha. Early detection and tracking of bulbar changes in ALS via frequent and remote speech analysis. *NPJ digital medicine*, 3(1):1-5, 2020.

[20] D. Suendermann-Oeft, A. Robinson, A. Cornish, D. Habberstad, D. Pautler, D. Schnelle-Walka, F. Haller, J. Liscombe, M. Neumann, M. Merrill, et al. NEMSI: A multimodal dialog system for screening of neurological or mental conditions. In *Proceedings of the 19th ACM International Conference on Intelligent Virtual Agents, pages 245-247*, 2019.

[21] V. Young and A. Mihailidis. Difficulties in automatic speech recognition of dysarthric speakers and implications for speech-based applications used by the elderly: A literature review. *Assistive Technology*, 22(2):99-112, 2010.

[22] Y. Yunusova, N. L. Graham, S. Shellikeri, K. Phuong, M. Kulkarni, E. Rochon, D. F. Tang-Wai, T. W. Chow, S. E. Black, L. H. Zinman, et al. Profiling speech and pausing in amyotrophic lateral sclerosis (ALS) and frontotemporal dementia (FTD). *PloS one*, 11(1):e0147573, 2016.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of customizing a computer-generated dialog session for a user having a speech pathology, comprising:
    eliciting speech from a user and corresponding facial movements from a user from a plurality of tasks during the computer-generated dialog session;
    identifying, by a computer device, (a) a span of speech and (b) a span of non-speech in an audio stream of the user's speech, wherein the identification of the span of speech and span of non-speech comprises:
        calculating, by the computing device, a value of a frame within the stream based on the logarithm of the root mean squared of the energy of the frame;
        comparing, by the computing device, the value to a threshold;
        marking, by the computing device, the frame as one of: speech if the value meets the threshold; and non-speech if the value is below the threshold;
    altering, by the computing device, a plurality of the following configurable parameters: (a) a threshold minimum signal strength of the user's speech (dB) to consider as the start of the span of the user's speech; (b) an adjustment factor by which signal strengths of background noise increases between consecutive spans of the user's speech; (c) a threshold between signal strength during the span of speech and a signal strength during the span of non-speech; and
    presenting, by the computing device, the customized dialog session by applying one of the plurality of altered parameters;
    wherein the plurality of tasks comprise of: an open-ended question, a sustained vowel phonation, oral diadochokinesis alternating motion rate or a repetition of a pre-selected syllable, a speech intelligibility test sentence, a spontaneous speech while describing a pre-selected picture, or any combination thereof.

2. The method of claim 1, further comprising
    identifying, by the computing device, a start of speech in the audio stream as a function of the span of speech continuing for a first threshold period of time;
    identifying, by the computing device, an end of speech in the audio stream as a function of the span of non-speech continuing for a second threshold period of time.

3. The method of claim 1, further comprising beginning, by the computing device, the dialog session with a microphone check for speech and background noise.

4. The method of claim 1, further identifying, by the computing device, a user as having a particular speech pathology, and using the identification to set a plurality of the configurable parameters.

5. The method of claim 4, further comprising using, by the computing device, multiple questionnaires to identify progression of the particular speech pathology in the user.

6. The method of claim 1, further comprising customizing, by the computing device, the configurable parameters as a function of a plurality of the following linguistic features: prosody, voice quality, articulation, acoustics, respiration, and cognitive/mental/emotional state.

7. The method of claim 1, wherein the step of identifying the spans of speech and non-speech further comprises iterative re-estimation of speech sounds and background noise.

8. The method of claim 1, wherein the step of identifying the spans of speech and non-speech further comprises determining, by the computing device, spans of speech to be those in which an average signal level of speech sounds (dB) exceeds an average signal level of the background noise (dB) by a threshold amount.

9. The method of claim 1, further comprising calculating, by the computing device, a weighted penalty of proportions of false positive and false negative times, when compared to a hand annotation of actual speech in the audio stream.

10. The method of claim 1, further comprising using a questionnaire to ascertain scores for at least three different domains affected by the speech pathology, bulbar, limb, or respiratory.

* * * * *